United States Patent
Akahori

(10) Patent No.: US 8,055,232 B2
(45) Date of Patent: Nov. 8, 2011

(54) RADIO FREQUENCY RECEIVING APPARATUS, RADIO FREQUENCY RECEIVING METHOD, LSI FOR RADIO FREQUENCY SIGNAL AND LSI FOR BASE BAND SIGNAL

(75) Inventor: Hiroji Akahori, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 757 days.

(21) Appl. No.: 12/135,463

(22) Filed: Jun. 9, 2008

(65) Prior Publication Data
US 2009/0004987 A1    Jan. 1, 2009

(30) Foreign Application Priority Data
Jun. 26, 2007 (JP) ................... 2007-167508

(51) Int. Cl.
*H04B 1/06* (2006.01)
(52) U.S. Cl. ............ 455/251.1; 455/234.2; 455/245.2; 455/246.1; 455/247.1; 455/127.2; 330/278; 330/279
(58) Field of Classification Search ............ 455/251.1, 455/234.2, 245.2, 246.1, 247.1, 127.2, 245.1; 330/278, 279
See application file for complete search history.

(56) References Cited

U.S. PATENT DOCUMENTS

| | | | | |
|---|---|---|---|---|
| 6,977,550 B2* | 12/2005 | Ishida et al. | ........ | 330/279 |
| 7,005,922 B2* | 2/2006 | Oshima et al. | ........ | 330/278 |
| 7,853,224 B2* | 12/2010 | Exeter | ........ | 455/136 |

FOREIGN PATENT DOCUMENTS

| | | |
|---|---|---|
| JP | 2002290178 | 10/2002 |
| JP | 2005102008 | 4/2005 |

* cited by examiner

*Primary Examiner* — Sanh Phu
(74) *Attorney, Agent, or Firm* — Volentine & Whitt, PLLC

(57) ABSTRACT

A receiving apparatus may achieve optimal RF and IF gain control while suppressing saturated amplification due to interference. The receiving apparatus includes an RF variable gain Amp that amplifies a received RF signal, a mixer that converts an output signal of the RF variable gain Amp into an IF signal, an IF variable gain Amp that amplifies the IF signal, a demodulator that demodulates an output signal of the IF variable gain Amp, and an AGC circuit. The AGC circuit sets a period of gain control for the RF variable gain Amp to be shorter than a period of gain control for the IF variable gain Amp when gains of the RF variable gain Amp and the IF variable gain Amp are controlled based on the output signal of the IF variable gain Amp.

7 Claims, 6 Drawing Sheets

RADIO FREQUENCY RECEIVING APPARATUS, RADIO FREQUENCY RECEIVING METHOD, LSI FOR RADIO FREQUENCY SIGNAL AND LSI FOR BASE BAND SIGNAL

BACKGROUND OF THE INVENTION

1. Field of the Invention

The present invention relates to a receiving apparatus and a receiving method for receiving a radio frequency (RF) signal such as, for example, a terrestrial digital broadcasting wave and the like in mobile terminals, vehicle-mounted terminals and so on while moving or at stationary sites, an LSI (Large Scale Integration) for a radio frequency signal, and an LSI for a base band signal. More particularly, the present invention relates to an AGC independent control technique for selecting a channel of an RF signal received by an antenna, and performing an automatic gain control (AGC) for RF amplification and intermediate frequency (IF) amplification in an RF unit independently. This application claims priority under 35 U.S.C. §119 to Japanese Patent Application Serial No. 2007-167508 filed Jun. 26, 2007, the entire disclosure of which is hereby incorporated by reference herein.

2. Description of the Related Art

Japanese Patent Application Publication No. 2002-290178 discloses a technique for AGC in a receiving apparatus, the RF receiving apparatus having a frequency conversion circuit that converts an RF signal received by an antenna into an IF signal, including an RF variable gain amplifier (hereinafter amplifier being abbreviated as "Amp") that amplifies the RF signal; a mixer that amplifies a particular channel from an output signal of the RF gain Amp and outputs the IF signal; first and second IF variable gain Amps that amplify the IF signal output from the mixer; a demodulation circuit that demodulates the IF signal from the second IF variable gain Amp; a detection circuit that detects a level of the IF signal from the second IF variable gain Amp and controls a gain of the second IF variable gain Amp based on a result of the detection; and a comparison circuit that compares an output of the detection circuit with a preset level and controls gains of the RF variable gain Amp and the first IF variable gain Amp based on a result of the comparison. The RF variable gain Amp generally includes a low noise Amp (LNA) that amplifies an RF signal with low noise.

The disclosed RF receiving apparatus performs gain control of the second IF variable gain Amp until the detection level of the received input signal reaches a predetermined value, and performs gain control of the RF variable gain Amp when the detection level exceeds the predetermined value. In this manner, in performing an AGC operation to keep the level of the input signal for the demodulation circuit constant, it is possible to perform the AGC operation at high speed and to deal with a strong input.

Japanese Patent Application Publication No. 2005-102008 also discloses a technique for AGC in a receiving apparatus, wherein the receiving apparatus and receiving method are capable of improving reliability of AGC by changing a gain of a RF variable gain Amp and keeping a gain of an IF variable gain Amp constant when a received signal is large, and by keeping the gain of the RF variable gain Amp constant and changing the gain of the IF variable gain Amp when the received signal is small.

However, the receiving methods and apparatuses as noted above have the following problems.

A first problem is considered with reference to FIG. 5 of the present application. FIG. 5 is a waveform diagram showing examples of an RF variable gain Amp gain control (RF-AGC) operation and an IF variable gain Amp gain control (IF-AGC) operation in a conventional receiving apparatus. The conventional receiving apparatus changes a gain of one of the RF variable gain Amp and the IF variable gain Amp depending on input levels IN1 to IN3, which are input levels of a signal received by an antenna. For example, the gains of the RF variable gain Amp and the IF variable gain Amp are enlarged for small input levels up to input level IN1, and as the input level increases to IN2, the gain of the IF variable gain Amp is decreased to the minimum level and the gain of the RF variable gain Amp remains unchanged. As the input level further increases to input level IN3 corresponding to the maximum value of dynamic range, the gain of the RF variable gain Amp decreases to the minimum level. However, in such a gain changing method, since an RF gain variable range is different from an IF gain variable range, it is not possible to perform proper gain control due to a difference between RF response speed and IF response speed.

A second problem is considered with reference to FIG. 6 of the present application. FIG. 6 is a schematic waveform diagram of frequency vs. signal level (intensity), showing interference between a desired received signal and adjacent channel signals. In the prior art, when a plurality of interference with very strong power from adjacent channels are received out-of-band from the desired received signal, a band pass filter (BPF) may be used at input sides of an LNA and a mixer to filter out undesired signals. However, in the absence of a filter that limits a frequency band to a desired signal band, undesired signals may occur due to saturated amplification, thereby deteriorating the received signal and line quality. Accordingly, there arises a need to control an RF variable gain Amp constituted by an LNA so that it does not have excessive gain. However, there also arises a need for the RF variable gain Amp to have sufficient gain in order not to deteriorate signal quality such as a noise figure (NF) of the LNA. There is a need to achieve optimal gain control from these conflicting constraints.

However, in the conventional receiving method, as shown in FIG. 6, when the power of the interference is large compared to the small power of the desired received signal, the gain of the RE variable gain Amp becomes maximal, which results in a higher possibility of saturated amplification due to signal interference. For example and as shown in FIG. 6, in some cases a signal level (intensity) of a desired received signal CH0 may become decreased, and signal level (intensity) of adjacent channel signals CH1 and CH2 may become enlarged under a phasing effect, so that a synthetic signal is produced due to interference at a receiving point between a direct wave and a reflected wave due to fast movement of a mobile receiver. In this case, when the signals CH0, CH1 and CH2 are amplified, the desired signal CH0 interferes with the amplified adjacent channel signals CH1 and CH2, which results in deterioration of reception quality of the desired signal CH0.

SUMMARY OF THE INVENTION

In order to solve the above problems, it is an object of the present invention to provide an automatic gain control technique and apparatus that performs AGC for RF amplification and AGC for intermediate frequency (IF) amplification independently.

To achieve this object, according to the present invention, there is provided a receiving method in which a received RF signal is amplified by an RF variable gain Amp, the amplified signal is converted into an IF signal, the IF signal is amplified by an IF variable gain Amp, and the amplified IF signal is demodulated. A period of gain control for the RF variable gain Amp is set to be shorter than a period of gain control for the IF variable gain Amp.

To achieve this object, according to the present invention, there is also provided a receiving apparatus including an RF variable gain Amp that amplifies a received RF signal; a conversion circuit that converts an output signal of the RF variable gain Amp into an IF signal; an IF variable gain Amp that amplifies an output signal of the conversion circuit; a demodulation circuit that demodulates an output signal of the IF variable gain Amp; and an AGC circuit. The AGC circuit sets a period of gain control for the RF variable gain Amp to be shorter than a period of gain control for the IF variable gain Amp, whereby respective gain of the RF variable gain Amp and the IF variable gain Amp are controlled based on the output signal of the IF variable gain Amp.

According to the present invention, since the period of gain control of the RF variable gain Amp is set to be shorter than the period of gain control of the IF variable gain Amp, saturated amplification that may occur due to interference power may be avoided by suppressing the gain of the RF variable gain Amp following sudden change of received power. In addition, since it is possible to control the gain of the IF variable gain Amp at high speed, it is possible to follow fast changes of received signal power which occur during fast movement of the receiver.

BRIEF DESCRIPTION OF THE DRAWINGS

The above and other aspects and features of the present invention will become readily apparent from the detailed description that follows, with reference to the accompanying drawings, in which.

DESCRIPTION OF THE PREFERRED EMBODIMENTS

The present invention will not be described by way of preferred, but non-limiting embodiments of the invention. The referenced drawings are presented for illustrative purposes only, and are not intended to limit the scope of the invention.

A receiving method is disclosed in which a received RF signal is amplified by an RF variable gain Amp, the amplified signal is converted into an IF signal, the IF signal is amplified by an IF variable gain Amp, and the amplified IF signal is demodulated, wherein a period of gain control for the RF variable gain Amp is set to be shorter than a period of gain control for the IF variable gain Amp. In the receiving method, a response speed of the RF variable gain Amp may be varied depending on a moving speed of a mobile receiver.

Figure 1:
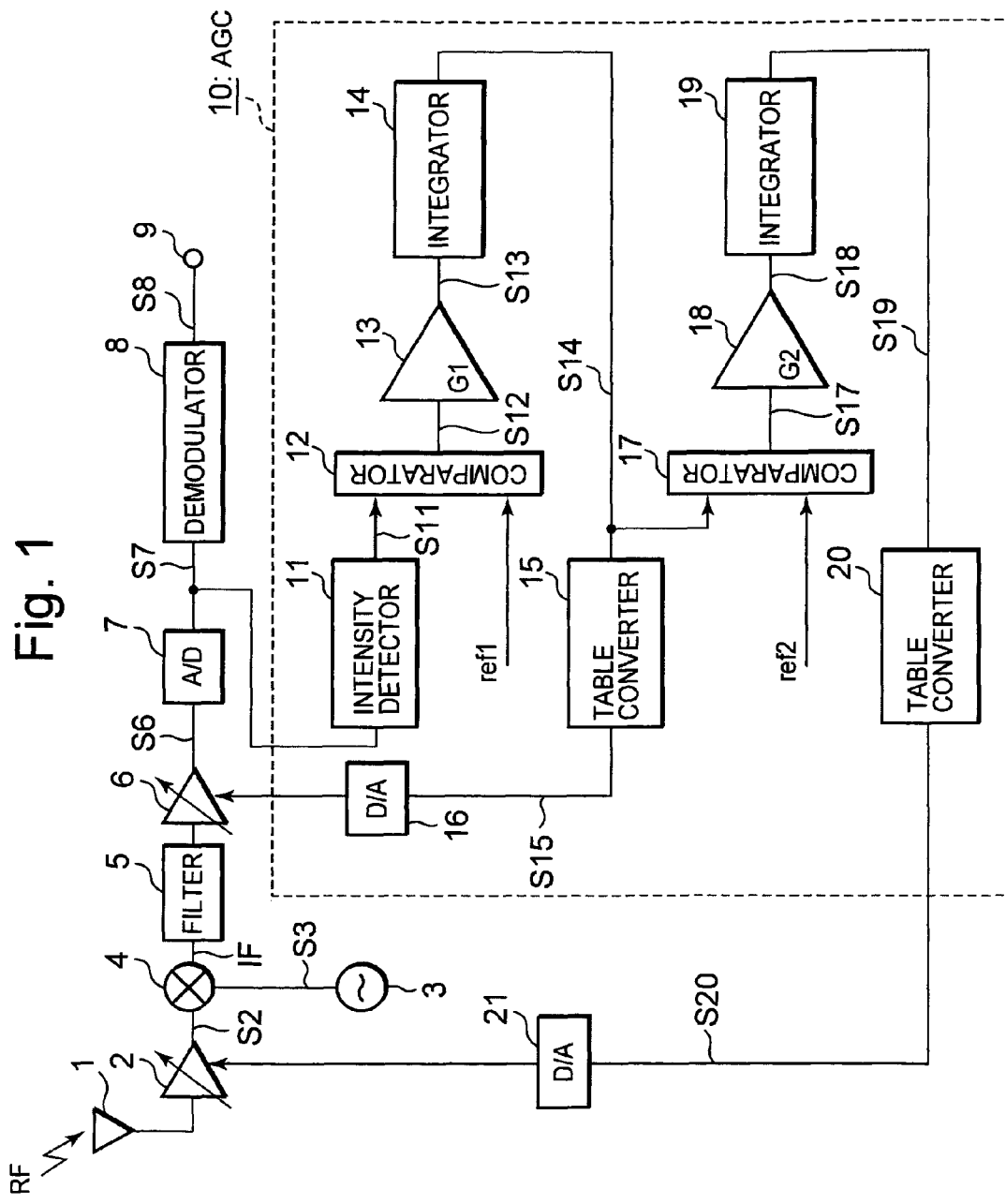
FIG. 1 is a schematic view showing a configuration of a receiving apparatus according to a first embodiment of the present invention.

FIG. 1 is a schematic view showing a configuration of a receiving apparatus according to a first embodiment of the present invention. The receiving apparatus, which is configured by large scale integration (LSI) or the like, includes an antenna 1 that receives an RF signal such as a terrestrial digital broadcasting wave or the like, an RF variable gain Amp 2 connected to the antenna 1, a local oscillator 3 that outputs a local oscillating signal S3 having a predetermined frequency, and a mixer 4 connected to outputs of RF variable gain Amp 2 and local oscillator 3. Local oscillator 3 and mixer 4 together form a conversion circuit. RF variable gain Amp 2, which is for example configured by an LNA, amplifies the RF signal received by antenna 1 based on gain set by gain control signal S19 fed back from AGC circuit 10, and outputs an output signal S2 to mixer 4. Mixer 4 mixes the output signal S2 with local oscillating signal S3 and outputs an IF signal, which is provided to IF variable gain Amp 6 via filter 5.

Filter 5, which is configured by a low pass filter (LPF), a band pass filter (BPF) or the like, filters out signals having undesired frequency bands. IF variable gain Amp 6 amplifies the IF signal from filter 5 based on gain set by gain control signal S15 fed back from AGC circuit 10, and outputs an analog output signal S6 to analog/digital (A/D) converter 7. A/D converter 7 converts the analog output signal S6 into a digital output signal S7, which is provided to demodulator 8. Demodulator 8 demodulates the digital output signal S7 from A/D converter 7 using a fast Fourier transform (FFT) for example, and outputs a demodulation signal S8 to output terminal 9. A/D converter 7 and demodulator 8 together form a demodulation processing circuit.

AGC circuit 10 includes a first control circuit that controls a gain of IF variable gain Amp 6 based on the digital output signal S7 of A/D converter 7, and a second control circuit that controls a gain of RF variable gain Amp 2 in response to a signal from the first control circuit.

The first control circuit of AGC circuit 10 shown in FIG. 1 includes a received signal intensity detector 11 that detects a received signal level (intensity) from the digital output signal S7 of A/D converter 7, and outputs a detection signal S11. A comparator 12 is connected to an output of the received signal intensity detector 11. Comparator 12 compares a magnitude of the detection signal S11 with a reference signal ref1, and outputs a comparison signal S12 based on a result of the comparison. An integrator 14 is connected to an output of the comparator 12 via a loop gain multiplier 13. Loop gain multiplier 13 multiplies the comparison signal S12 by a predetermined loop gain G1, and outputs a multiplication value S13 to integrator 14. Integrator 14 integrates the multiplication value S13 and outputs an integral value S14. A table converter 15 and a second control circuit within AGC circuit 10 are connected to an output of integrator 14.

Table converter 15 receives the integral value S14 and outputs a gain control signal S15, to provide the integral value S14 to IF variable gain Amp 6. For example, table converter 15 may be configured by a memory in which predetermined coefficients a and b in the following linear equation (1) are stored:

$$y = ax + b \qquad (1),$$

wherein x is integral value S14 as an input signal, and y is gain control signal S15 as an output signal. Upon receiving the integral value S14 as the input signal x, table converter 15 uses the integral value S14 and the above equation (1) to obtain the gain control signal S15 as the output signal y, and provides the obtained gain control signal S15 to IF variable gain Amp 6 via digital/analog (D/A) converter 16.

The second control circuit of AGC circuit 10 shown in FIG. 1 includes a comparator 17 connected to the output of integrator 14. Comparator 17 compares the integral value S14 with a reference signal ref2, and outputs a comparison signal S17 based on a result of the comparison. A loop gain multiplier 18, an integrator 19 and a table converter 20 are cascaded to an output of comparator 17, and are feedback-connected to a control terminal of RF variable gain Amp 2 in a manner similar to the first control circuit. The loop gain multiplier 18 multiplies the comparison signal S17 by a predetermined loop gain G2 (loop gain G2<<loop gain G1) and outputs a multiplication value S18 to integrator 19 in a manner similar to loop gain multiplier 13. Integrator 19 integrates the multiplication value S18 and outputs an integral value S19 to table converter 20, in a manner similar to the integrator 14. Table converter 20 receives the integral value S19 and outputs a gain control signal S20, to provide the integral value S19 to RF variable gain Amp 2 via D/A converter 21 in a manner similar to table converter 15. For example, table converter 20 may be configured by a memory in which predetermined coefficients a and b in the above equation (1) are stored. Upon receiving the integral value S19 as an input signal x, table converter 20 uses the integral value S19 and the above equation (1) to obtain the gain control signal S20 as an output signal y, and provides the obtained gain control signal S20 to RF variable gain Amp 2 via D/A converter 21.

In addition, the receiving apparatus shown in FIG. 1 may be divided into an RF-LSI (LSI for radio frequency signal) having a radio frequency circuit, and a base band LSI (LSI for base band signal) having a base band circuit. In such a case, the radio frequency circuit is configured to include RF variable gain Amp 2, mixer 4 and IF variable gain Amp 6 shown in FIG. 1, and the base band circuit is configured to include A/D converter 7, demodulator 8 and AGC circuit 10 shown in FIG. 1.

Operation of the receiving apparatus shown in FIG. 1 is described as follows. The RF signal received by antenna 1 is amplified by RF variable gain Amp 2 based on an RF-AGC gain set by the gain control signal S20 provided from AGC circuit 10, and the output signal S2 from RF variable gain Amp 2 is provided to mixer 4. Mixer 4 mixes the output signal S2 with the local oscillating signal S3 from local oscillator 3 to generate the IF signal. Filter 5 filters signals having undesired frequency bands out of the IF signal, so that only desired frequency bands remain in the IF signal. The IF signal subjected to the filtering operation is amplified by IF variable gain Amp 6 based on an IF-AGC gain set by the gain control signal S15 provided from AGC circuit 10, and the analog output signal S6 from the IF variable gain Amp 6 is provided to A/D converter 7. The analog output signal S6 is converted into a digital signal by A/D converter 7, the digital signal is then demodulated by demodulator 8 to generate the demodulation signal S8, and then the demodulation signal S8 is output through output terminal 9. In addition, the digital output signal S7 from A/D converter 7 is also provided to AGC circuit 10.

When the digital output signal S7 is provided to AGC circuit 10, a signal level (i.e., intensity of an input level) of the digital output signal S7 is detected by received signal intensity detector 11, and the detection signal S11 is subsequently output from received signal intensity detector 11. Comparator 12 compares the magnitude of the detection signal S11 with the reference signal ref1, and outputs the comparison signal S12 based on a result of the comparison. Loop gain multiplier 13 multiplies the comparison signal S12 by the loop gain G1 to generate the multiplication value S13. Integrator 14 integrates the multiplication value S13 to generate the integral value S14, which is provided to table converter 15 and comparator 17.

Table converter 15 converts the integral value S14 into the gain control signal S15 based on the above equation (1), and provides the gain control signal S15 to IF variable gain Amp 6 via D/A converter 16. Accordingly, the gain of IF variable gain Amp 6 is changed, the IF signal from filter 5 is amplified by IF variable gain Amp 6 based on the changed gain, and the output signal S6 from IF variable gain Amp 6 is provided to A/D converter 7 and received signal intensity detector 11.

In the mean time, comparator 17 compares the integral value S14 output from integrator 14 with the reference signal ref2, and outputs the comparison signal S17 based on a result of the comparison. Loop gain multiplier 18 multiplies the comparison signal S17 by the loop gain G2 (loop gain G2<<loop gain G1) to generate the multiplication value S18. Integrator 19 integrates the multiplication value S18 to generate the integral value S19. Table converter 20 converts the integral value S19 into the gain control signal S20 based on the above equation (1), and provides the gain control signal S20 to RF variable gain Amp 2 via D/A converter 21. Accordingly, the gain of RF variable gain Amp 2 is changed, the received signal by the antenna 1 is amplified by RF variable gain Amp 2 based on the changed gain, and the output signal S2 from RF variable gain Amp 2 is converted into the IF signal in mixer 4.

Figure 2:
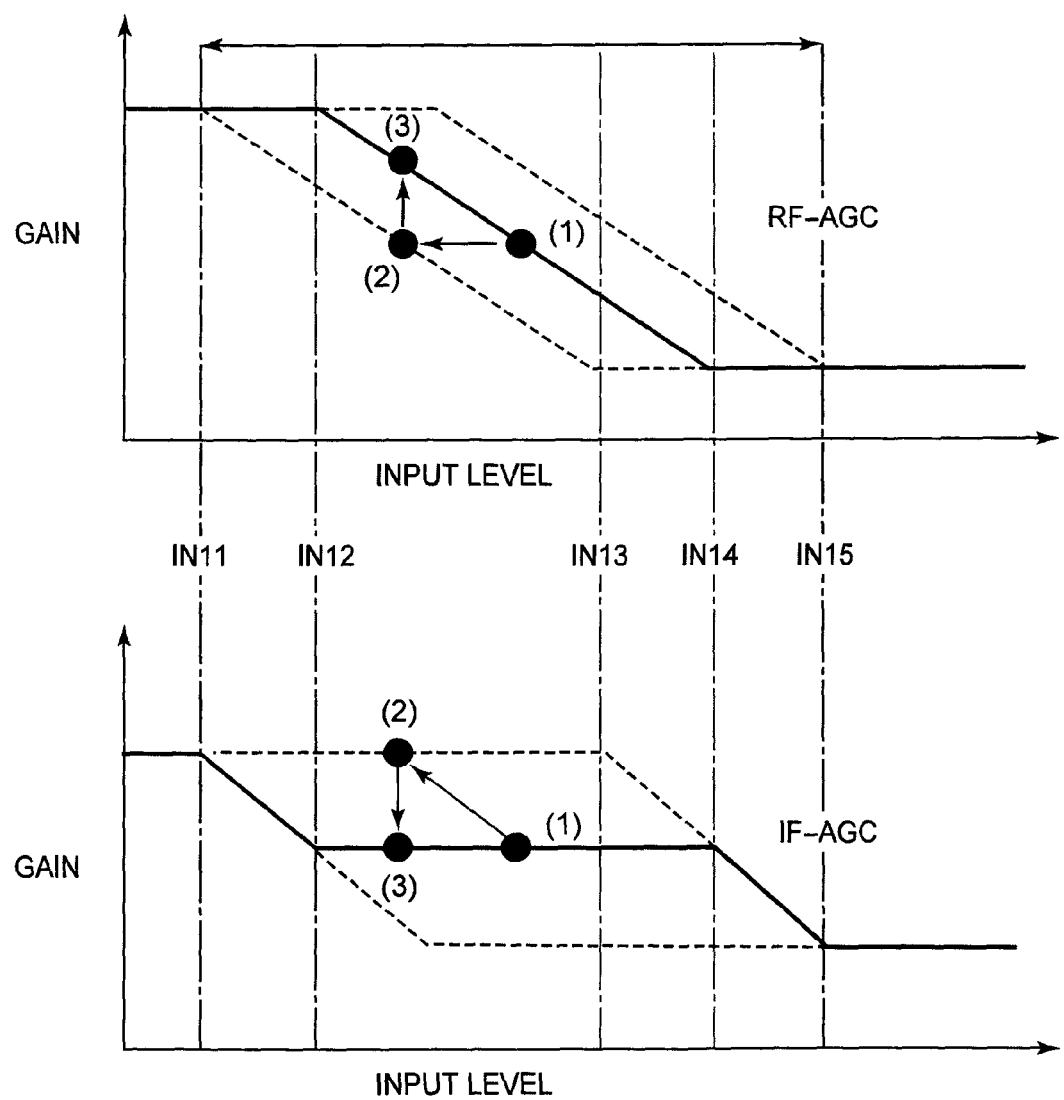
FIG. 2 is a waveform diagram showing examples of an RF variable gain Amp gain control (RF-AGC) operation and an IF variable gain Amp gain control (IF-AGC) operation in the receiving apparatus of FIG. 1.
Figure 3:
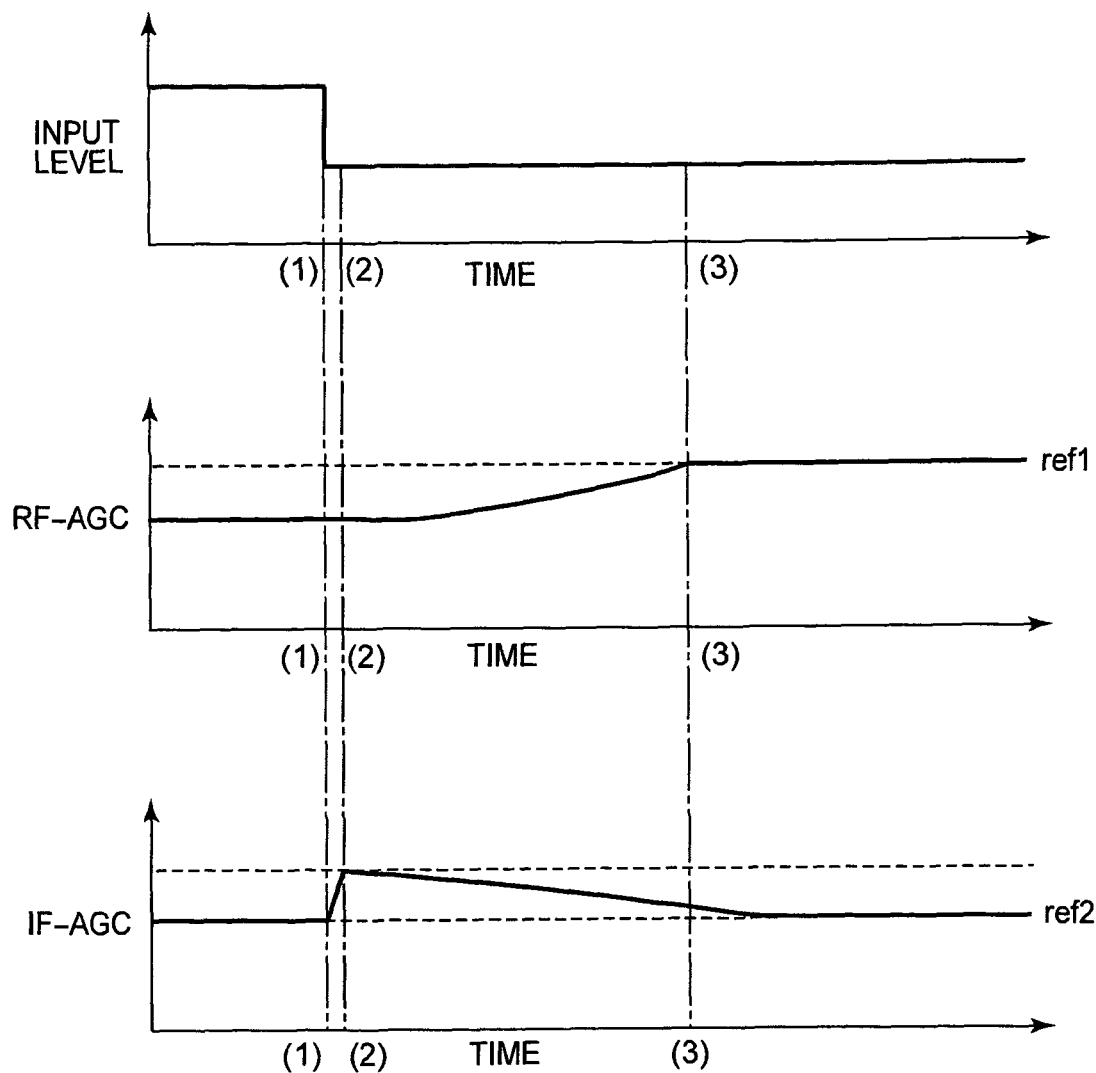
FIG. 3 is a waveform diagram showing examples of an RF variable gain Amp gain control (RF-AGC) operation and an IF variable gain Amp gain control (IF-AGC) operation in the receiving apparatus of FIG. 1.

FIGS. 2 and 3 are waveform diagrams showing examples of an RF variable gain Amp gain control (RF-AGC) operation and an IF variable gain Amp gain control (IF-AGC) operation in the receiving apparatus of FIG. 1. Particularly, FIG. 2 is a waveform diagram showing gains of an RF-AGC and an IF-AGC with respect to an input level of a received signal, and FIG. 3 is a waveform diagram showing an input level, an RF-AGC gain and an IF-AGC gain with respect to time. Hereinafter, the function of the AGC circuit 10 when an input level of an received signal is changed will be described with reference to FIGS. 2 and 3.

As seen by the curved lines indicated by solid lines in FIG. 2, the gains of RF variable gain Amp 2 and IF variable gain Amp 6 are enlarged together for input signals having a small input level up to input level IN11, and as the input level of the input signal increases to IN12, the gain of IF variable gain Amp 6 is decreased to a midrange level and the gain of RF variable gain Amp 2 remains unchanged. As the input level further increases through IN13 to IN14, the gain of IF variable gain Amp 6 remains unchanged while the gain of RF variable gain Amp 2 decreases to the minimum level. In addition, as the input level increases to IN15 which is the maximum of dynamic range, the gain of IF variable gain Amp 6 decreases to the minimum level and the gain of RF variable gain Amp 2 remains unchanged.

As seen by the curved lines indicated by dashed lines in FIG. 2 and solid lines in FIG. 3, when the input level is suddenly changed, that is when the input level is suddenly decreased from time (1) to time (2) shown in FIG. 3, the gain control signal S15 that controls IF variable gain Amp 6 follows such sudden change at high speed so that the gain of IF variable gain Amp 6 is enlarged. After the correction, the gain of RF variable gain Amp 2 slowly follows change of the input level and is enlarged by the gain control signal S19 so that gain of the IF variable gain Amp 6 reaches a desired level, finally reaching a level (3).

In this manner, since the loop gains G1 and G2 of loop gain multipliers 13 and 18 have a relationship of G1>>G2, the gain control (IF-AGC) for IF variable gain Amp 6 follows the change of the input level at a high speed and the gain control (RF-AGC) for RF variable gain Amp 2 follows the change of the input level at a low speed.

Accordingly, since the control period (response speed) of IF variable gain Amp 6 is set to be different from the control period (response speed) of RF variable gain Amp 2, that is since the control period (response speed) of RF variable gain Amp 2 is set to be shorter than the control period (response speed) of IF variable gain Amp 6, it is difficult to generate saturated amplification due to interference power by suppressing the gain of RF variable gain Amp 2 while following sudden change of received power which occurs with fast movement of the receiver. In addition, since it is possible to control the gain of IF variable gain Amp 6 at high speed, it is possible to follow fast change of received signal power which occurs with fast movement of the receiver.

Figure 4:
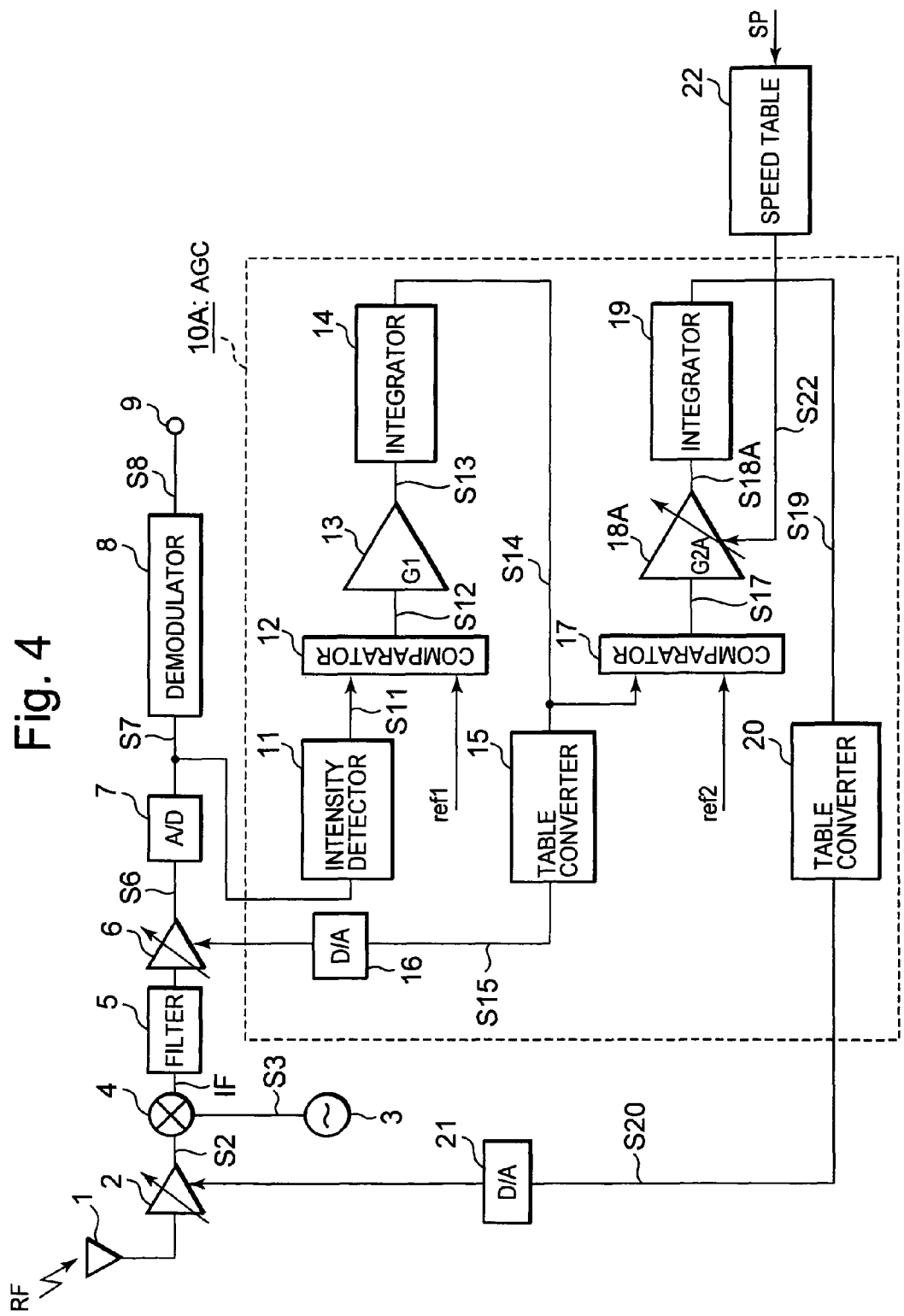
FIG. 4 is a schematic view showing a configuration of a receiving apparatus according to a second embodiment of the present invention.
Figure 5:
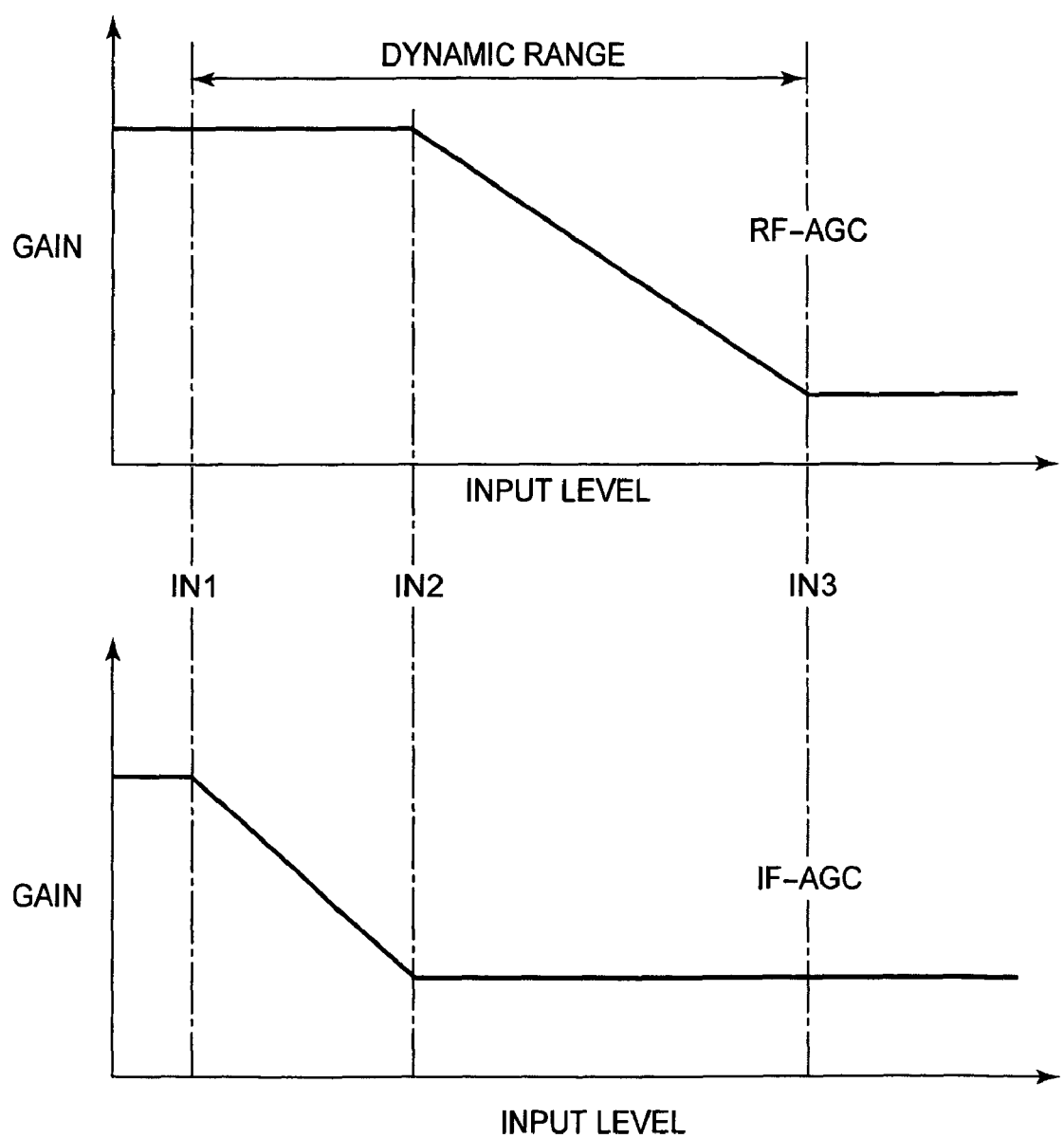
FIG. 5 is a waveform diagram showing examples of an RE variable gain Amp gain control (RF-AGC) operation and an IF variable gain Amp gain control (IF-AGC) operation in a conventional receiving apparatus.
Figure 6:
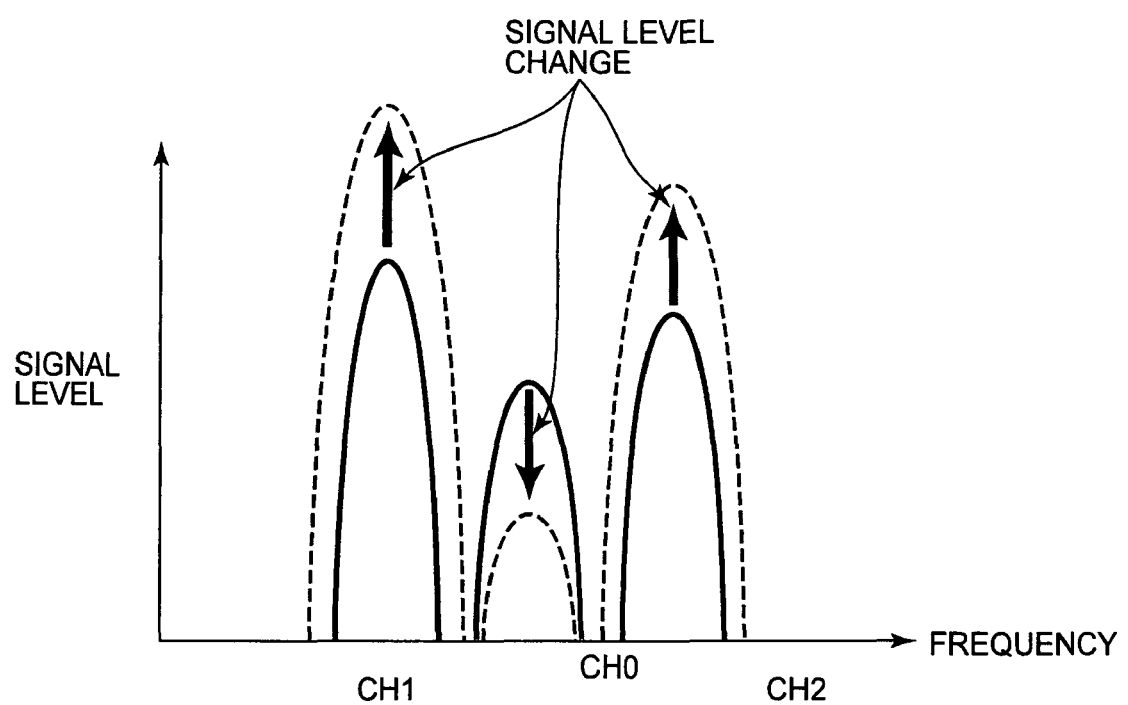
FIG. 6 is a schematic waveform diagram of a frequency vs. signal level (intensity) showing interference between a desired received signal and an adjacent channel signal.

FIG. 4 is a schematic view showing a configuration of a receiving apparatus according to a second embodiment, where the same elements as in FIG. 1 showing the first embodiment are denoted by the same reference numerals. In the receiving apparatus according to the second embodiment shown in FIG. 4, instead of AGC circuit 10 of the first embodiment shown in FIG. 1, an AGC circuit 10A having a configuration different from that of AGC circuit 10 is provided. AGC circuit 10A of the second embodiment shown in FIG. 4 is provided with a loop gain multiplier 18A having a variable loop gain G2A, instead of loop gain multiplier 18 having the fixed loop gain G2 in AGC circuit 10 of the first embodiment shown in FIG. 1. Loop gain G2A has a configuration that is variable responsive to an output signal S22 of speed table 22. Speed table 22, which is configured by a memory or the like in which coefficients and the like are stored, receives a moving speed estimation signal SP of the receiving apparatus externally from outside of AGC 10A, and outputs the output signal S22 such as a coefficient or the like based on the estimation signal SP to change the loop gain G2A. The remaining configuration of the second embodiment is the same as the first embodiment, and description thereof is thus omitted for the sake of brevity.

Operation of the receiving apparatus as shown in FIG. 4 is described as follows. When the moving speed estimation signal SP of the receiving apparatus is input from the outside to speed table 22, speed table 22 outputs the output signal S22 based on the estimation signal SP to change the loop gain G2A of loop gain multiplier 18A. Accordingly, a multiplication value S18A output from loop gain multiplier 18A is changed, thereby changing the response speed of the gain control (RF-AGC) for the RF variable gain Amp 2. Accordingly, for fast movement of a mobile receiver, since average power of a received signal is quickly changed in a relatively short interval as compared to slow movement of the mobile receiver, the response speed of the gain control (RF-AGC) for RF variable gain Amp 2 is increased, thereby making proper gain control possible.

According to the second embodiment, since the response speed of the gain control (RF-AGC) for RF variable gain Amp 2 is varied depending on the moving speed of the mobile receiver, it is possible to achieve proper gain control according to the moving speed of the mobile receiver, thereby improving reliability of the moving receiver.

The present invention is not limited to the above described embodiments. For example, other different uses and modifications are possible, such as excluding filter 5 from the receiving apparatus, adding the functions of different circuits, and changing the configuration of AGC circuits 10 and 10A, and changing the receiving method according to such change. These modifications can be made to the embodiments described above will still falling within the scope of the appended claims.

What is claimed is:

1. A receiving method in which a received radio frequency signal is amplified by a radio frequency variable gain amplifier, the amplified signal is converted into an intermediate frequency signal, the intermediate frequency signal is amplified by an intermediate frequency variable gain amplifier, and the amplified intermediate frequency signal is demodulated,
   wherein a period of gain control for the radio frequency variable gain amplifier is set to be shorter than a period of gain control for the intermediate frequency variable gain amplifier, and
   wherein the receiving method is for a mobile receiver, and wherein a response speed of the radio frequency variable gain amplifier is varied depending on a moving speed of the mobile receiver.

2. A receiving apparatus comprising:
   a radio frequency variable gain amplifier that amplifies a received radio frequency signal;
   a conversion circuit that converts an output signal of the radio frequency variable gain amplifier into an intermediate frequency signal;
   an intermediate frequency variable gain amplifier that amplifies an output signal of the conversion circuit;
   a demodulation circuit that demodulates an output signal of the intermediate frequency variable gain amplifier; and
   an automatic gain control circuit that sets a period of gain control for the radio frequency variable gain amplifier to be shorter than a period of gain control for the intermediate frequency variable gain amplifier, when gains of the radio frequency variable gain amplifier and the intermediate frequency variable gain amplifier are controlled based on the output signal of the intermediate frequency variable gain amplifier,
   wherein the automatic gain control circuit comprises: a first control circuit that controls the gain of the intermediate frequency variable gain amplifier based on the output signal of the intermediate frequency variable gain amplifier, and a second control circuit that controls the gain of the radio frequency variable gain amplifier in response to a signal from the first control circuit, and
   wherein the receiving apparatus is a mobile receiver, and the second control circuit varies a response speed of the radio frequency variable gain amplifier depending on a moving speed of the mobile receiver.

3. The receiving apparatus according to claim 2, wherein the conversion circuit includes a mixer that converts the output signal of the radio frequency variable gain amplifier into the intermediate frequency signal by mixing the output signal of the radio frequency variable gain amplifier with a local oscillating signal having a predetermined frequency.

4. The receiving apparatus according to claim 3, further comprising a local oscillating circuit that generates the local oscillating signal having the predetermined frequency.

5. The receiving apparatus according to claim 2, wherein the demodulation circuit comprises:
   an analog/digital converter that converts the output signal of the intermediate frequency variable gain amplifier into a digital signal; and
   a demodulator that demodulates an output signal of the analog/digital converter.

6. An LSI for a base band signal for connection to an LSI for a radio frequency signal including a radio frequency variable gain amplifier that amplifies a received radio frequency signal, a conversion circuit that converts an output signal of the radio frequency variable gain amplifier into an intermediate frequency signal, and an intermediate frequency variable gain amplifier that amplifies an output signal of the conversion circuit, wherein the LSI for a base band signal comprises an automatic gain control circuit that controls gains of the radio frequency variable gain amplifier and the intermediate frequency variable gain amplifier under a condition where a period of gain control for the radio frequency variable gain amplifier is set to be shorter than a period of gain control for the intermediate frequency variable gain amplifier, wherein the automatic gain control circuit comprises: a first control circuit that controls the gain of the intermediate frequency variable gain amplifier based on the output signal of the intermediate frequency variable gain amplifier, and a second control circuit that controls the gain of the radio frequency variable gain amplifier in response to a signal from the first control circuit, and wherein the LSI is for a mobile receiver, and wherein the second control circuit varies a response speed of the radio frequency variable gain amplifier depending on a moving speed of the mobile receiver.

7. The LSI for a base band signal according to claim 6, further comprising a demodulation circuit that demodulates the output signal of the intermediate frequency variable gain amplifier.

* * * * *